United States Patent
Chu et al.

(10) Patent No.: US 9,942,193 B1
(45) Date of Patent: Apr. 10, 2018

(54) BASIC SERVICE SET COLOR IDENTIFIER

(71) Applicant: Marvell International Ltd., Hamilton (BM)

(72) Inventors: Liwen Chu, San Ramon, CA (US); Hongyuan Zhang, Fremont, CA (US); Lei Wang, San Diego, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 115 days.

(21) Appl. No.: 14/961,359

(22) Filed: Dec. 7, 2015

Related U.S. Application Data

(60) Provisional application No. 62/088,008, filed on Dec. 5, 2014, provisional application No. 62/112,967, filed (Continued)

(51) Int. Cl.
*H04W 84/12* (2009.01)
*H04L 29/12* (2006.01)

(52) U.S. Cl.
CPC ......... *H04L 61/2038* (2013.01); *H04W 84/12* (2013.01); *H04L 61/6072* (2013.01)

(58) Field of Classification Search
CPC . H04L 61/2038; H04L 61/6072; H04W 84/12
See application file for complete search history.

(56) References Cited

U.S. PATENT DOCUMENTS 8,867,653 B2   10/2014  Zhang et al.

8,948,283 B2   2/2015   Zhang
(Continued)

FOREIGN PATENT DOCUMENTS

WO   WO-2012/122119   9/2012

OTHER PUBLICATIONS

IEEE Std 802.11™ 2012 (Revision of IEEE Std 802. Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Alex Skripnikov
*Assistant Examiner* — Sharmin Chowdhury

(57) ABSTRACT

A method for changing a first basic service set (BSS) color identifier for a first communication device identifiable by the first BSS color identifier and a first basic service set identifier that is longer than the first BSS color identifier is described. An indication that the first BSS color identifier and a second BSS color identifier for a second communication device have a same first value is received by the first communication device. Respective service coverage areas of the first and second communication devices at least partially overlap. A second value of the first BSS color identifier is determined by the first communication device in response to the indication. A notification frame that indicates the second value and a start time are generated by the first communication device. The first BSS color identifier is changed by the first communication device to the second value based on the start time.

24 Claims, 9 Drawing Sheets

Related U.S. Application Data on Feb. 6, 2015, provisional application No. 62/140,393, filed on Mar. 30, 2015.

(56) References Cited

U.S. PATENT DOCUMENTS

| | | | |
|---|---|---|---|
| 9,088,908 | B2 | 7/2015 | Liu |
| 9,130,727 | B2 | 9/2015 | Zhang et al. |
| 9,661,556 | B2* | 5/2017 | Sawada ................. H04W 48/12 |
| 2009/0196163 | A1 | 8/2009 | Du |
| 2009/0196212 | A1* | 8/2009 | Wentink ............ H04W 52/0235 |
| | | | 370/311 |
| 2012/0294294 | A1 | 11/2012 | Zhang |
| 2012/0314696 | A1* | 12/2012 | Liu ...................... H04W 28/065 |
| | | | 370/338 |
| 2013/0202001 | A1 | 8/2013 | Zhang |
| 2013/0229996 | A1 | 9/2013 | Wang et al. |
| 2013/0235796 | A1* | 9/2013 | Kwon ............... H04W 72/0406 |
| | | | 370/328 |
| 2013/0272137 | A1* | 10/2013 | Kwon ................. H04W 72/042 |
| | | | 370/241 |
| 2015/0131517 | A1 | 5/2015 | Chu et al. |
| 2016/0112838 | A1* | 4/2016 | Kaushik ................ H04W 4/023 |
| | | | 455/456.3 |

OTHER PUBLICATIONS

Hiertz et al., "The IEEE 802.11 Universe," IEEE Communications Magazine, pp. 62-70, (Jan. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
IEEE Std 802.11 ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11 ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11 ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11 ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11 ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11 ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11 ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
Yu et al., "Coverage extension for IEEE802.11ah," *The Institute of Electrical and Electronics Engineers*, doc. No. IEEE 802.11-11/0035r1, pp. 1-10 (Jan. 2011).
Taghavi et al., "Introductory Submission for TGah", doc. No. IEEE 802.11-11/0062r0, *Institute for Electrical and Electronics Engineers*, pp. 1-5 (Jan. 14, 2011).
de Vegt, "Potential Compromise for 802.11ah Use Case Document", Institute of Electrical and Electronics Engineers, doc. No. IEEE 802.11-11/0457r0, pp. 1-27 (Mar. 2011).
Zhang et al., "11 ah Data Transmission Flow," *The Institute of Electrical and Electronics Engineers*, doc. No. IEEE 802.11-11/1484r1, pp. 1-15 (Nov. 2011).
Park, "Proposed Specification Framework for TGah", *The Institute of Electrical and Electronics Engineers*, doc. No. IEEE 802.11-11/1137r6, pp. 1-13 (Mar. 2012).
Park, "Proposed Specification Framework for TGah D9.x", The Institute of Electrical and Electronics Engineers, doc. No. IEEE 802.11-yy/xxxxr0, pp. 1-30 (Jul. 2012).
Vermani et al. "Preamble Format for 1 MHz," *The Institute of Electrical and Electronics Engineers*, doc. No. IEEE 802.11-11/1482r2, pp. 1-30 (Nov. 2011).
Zhang et al., "1MHz Waveform in Wider BW", *The Institute of Electrical and Electronics Engineers*, doc. No. IEEE 802.11-12/0309r1, pp. 1-10 (Mar. 2012).
Vermani et al. "Spec Framework Text for PHY Numerology," *The Institute of Electrical and Electronics Engineers*, doc. No. IEEE 802.11-11/1311r0, pp. 1-5 (Sep. 2011).
Park, "Proposed Specification Framework for TGah", *The Institute of Electrical and Electronics Engineers*, doc. No. IEEE 802.11-11/1137r11, pp. 1-36 (Sep. 2012).
Park, "Specification Framework for TGah," *The Institute of Electrical and Electronics Engineers*, doc. No. IEEE 802.11-11/1137r13, pp. 1-58 (Jan. 14, 2013).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Shao, "Channel Selection for 802.11ah," doc.: IEEE 802.11-12/0816r0, pp. 1-11 (Jul. 2012).
Park, "Proposed Specification Framework for TGah", *The Institute of Electrical and Electronics Engineers*, doc. No. IEEE 802.11--yy/xxxxr05, pp. 1-12 (Jan. 2012).

(56) References Cited

OTHER PUBLICATIONS

Park et al., "Low Power Capability Support for 802.11 ah," doc. No. IEEE 802.11-11/0060r1, *The Institute for Electrical and Electronics Engineers*, 7 pages (Jan. 17, 2011).

Chun et al., "Legacy Support on HEW frame structure," doc: IEEE 11-13/1057r0, *The Institute of Electrical and Electronics Engineers, Inc.*, pp. 1-8 (Sep. 2013).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

U.S. Appl. No. 14/961,512, entitled "Orthogonal Frequency Division Multiple Access Short Frame Format," filed Dec. 7, 2015.

U.S. Appl. No. 15/019,768, entitled "Orthogonal Frequency Division Multiple Access Resource Request," filed Feb. 9, 2016.

\* cited by examiner

BASIC SERVICE SET COLOR IDENTIFIER

CROSS-REFERENCES TO RELATED APPLICATIONS

This disclosure claims the benefit of U.S. Provisional Patent Application No. 62/088,008, entitled "BSS Identifier and OFDMA Short Frame Format," filed on Dec. 5, 2014, U.S. Provisional Patent Application No. 62/112,967, entitled "BSS Identifier and OFDMA Short Frame Format," filed on Feb. 6, 2015, and U.S. Provisional Patent Application No. 62/140,393, entitled "BSS Identifier and OFDMA Short Frame Format," filed on Mar. 30, 2015, the disclosures of each of which are incorporated herein by reference in their entireties.

Additionally, this application is related to U.S. patent application Ser. No. 14/961,512, entitled "ORTHOGONAL FREQUENCY DIVISION MULTIPLE ACCESS SHORT FRAME FORMAT," filed on the same day as the present application, the disclosure of which is incorporated herein by reference in its entirety.

FIELD OF THE DISCLOSURE

The present disclosure relates generally to communication networks and, more particularly, to wireless local area networks that utilize multiple basic service set identifiers having different lengths.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for changing a first basic service set (BSS) color identifier for a first communication device identifiable by i) the first BSS color identifier, and ii) a first basic service set identifier (BSSID) having a length that is longer than a length of the first BSS color identifier includes receiving, by the first communication device, an indication that the first BSS color identifier for the first communication device and a second BSS color identifier for a second communication device have a same first value. A first service coverage area of the first communication device at least partially overlaps a second service coverage area of the second communication device. The method includes determining, by the first communication device, a second value of the first BSS color identifier in response to the indication. The method includes generating, by the first communication device, one or more notification frames that indicate i) the second value of the first BSS color identifier, and ii) a start time at which the second value will supersede the first value of the first BSS color identifier. The method also includes changing, by the first communication device, the first BSS color identifier to the second value based on the start time.

In another embodiment, a first communication device that is identifiable by i) a first basic service set (BSS) color identifier, and ii) a first basic service set identifier (BSSID) having a length that is longer than a length of the first BSS color identifier includes a network interface device having one or more integrated circuits. The one or more integrated circuits are configured to: receive an indication that the first BSS color identifier for the first communication device and a second BSS color identifier for a second communication device have a same first value, wherein a first service coverage area of the first communication device at least partially overlaps a second service coverage area of the second communication device, determine a second value of the first BSS color identifier in response to the indication, generate one or more notification frames that indicate i) the second value of the first BSS color identifier, and ii) a start time at which the second value will supersede the first value of the first BSS color identifier, and change the first BSS color identifier to the second value based on the start time.

In yet another embodiment, a method for causing a change of a first basic service set (BSS) color identifier for a first communication device identifiable by i) the first BSS color identifier, and ii) a first basic service set identifier (BSSID) having a length that is longer than a length of the first BSS color identifier includes receiving, from a second communication device and by a third communication device, a first indication that the second communication device is identifiable by i) the first BSS color identifier, and ii) a second BSSID. The method includes receiving, from the first communication device and by the third communication device, a second indication that the first communication device is identifiable by i) the first BSS color identifier, and ii) the first BSSID. A first service coverage area of the first communication device at least partially overlaps a second service coverage area of the second communication device. The method also includes determining, by the third communication device, that the first BSS color identifier for the first communication device and the second BSS color identifier for the second communication device have a same first value. The method also includes generating, by the third communication device, a notification frame for the first communication device to cause the change of the first BSS color identifier, wherein the notification frame includes i) an indication that the first BSS color identifier for the first communication device and the second BSS color identifier for the second communication device have the same first value, and ii) the second BSSID.

In another embodiment, a first communication device includes a network interface device having one or more integrated circuits. The one or more integrated circuits are configured to: receive, from a second communication device, a first indication that the second communication device is identifiable by i) a first basic service set (BSS) color identifier, and ii) a first basic service set identifier (BSSID) having a length that is longer than a length of the first BSS color identifier, receive, from a third communication device, a second indication that the third communication device is identifiable by i) the first BSS color identifier, and ii) a second BSSID, wherein a first service coverage area of the second communication device at least partially overlaps a second service coverage area of the third communication device, determine that the first BSS color identifier for the second communication device and the second BSS color identifier for the third communication device have a same first value, and generate a notification frame for the second communication device to cause a change of the first BSS color identifier, wherein the notification frame includes i) an indication that the first BSS color identifier for the second communication device and the second BSS color identifier for the third communication device have the same first value, and ii) the second BSSID.

DETAILED DESCRIPTION

In embodiments described below, a wireless network device such as an access point (AP) of a wireless local area network (WLAN) is identifiable by a basic service set identifier (BSSID) and a basic service set (BSS) color identifier. In an embodiment, the BSSID is an identifier that uniquely identifies the access point, while the BSS color identifier has a shorter length than the BSSID but does not uniquely identify the access point. For example, the BSS color identifier is a short, local address that is unique within a wireless network associated with the device but is not unique with respect to other wireless networks, in an embodiment. The shorter length of the BSS color identifier helps to reduce signaling overhead for transmissions to the access point (e.g., uplink frames) and/or transmissions from the access point (e.g., downlink frames). In some scenarios, one or more "collisions" occur when a first access point and a second access point are located proximately to each other and have a same value for their respective BSS color identifiers. For example, a client station or other communication device that receives a downlink frame that includes the BSS color identifier, but omits the BSSID, cannot readily determine which access point transmitted the downlink frame. In an embodiment, a communication device that detects a collision transmits a suitable indication of the collision to the first access point to cause a change in a value of the BSS color identifier for the first access point.

Figure 1:
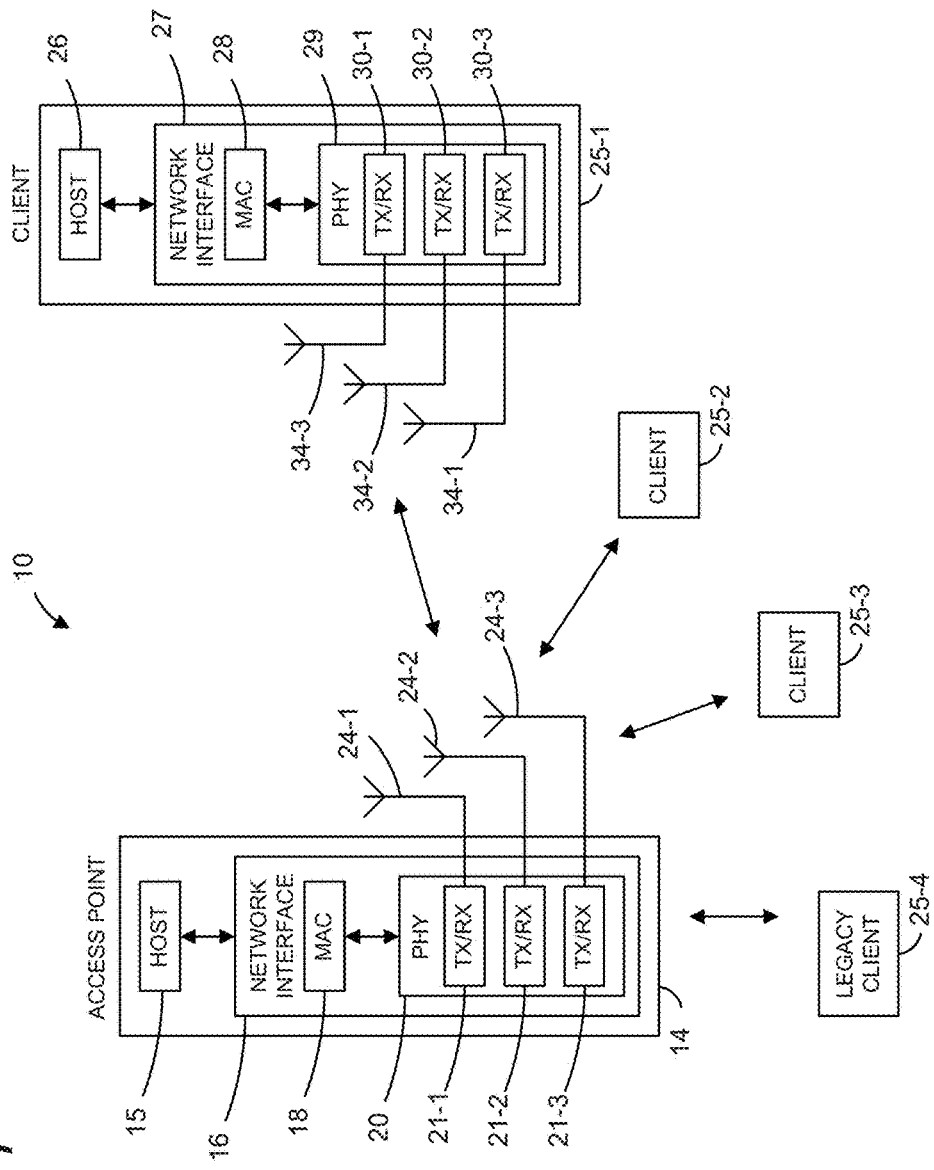
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized.

In one embodiment, the MAC processing unit 18 and the PHY processing unit 20 are configured to operate according to a first communication protocol (e.g., the HE communication protocol), including at least a first transmission mode and a second transmission mode of the first communication protocol. In some embodiments, the first transmission mode corresponds to a use of a BSS color identifier instead of a BSSID for transmissions to and/or from an access point, while the second transmission mode corresponds to a use of the BSSID for transmissions to and/or from the access point. The first transmission mode is configured to reduce signaling overhead as compared to the second transmission mode, which corresponds to an identifier for the access point that has a shorter length than for the second transmission mode. In another embodiment, the MAC processing unit 18 and the PHY processing unit 20 are also configured to operate according to a second communication protocol (e.g., according to the IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In various embodiments, the client device 25-1 is configured to receive OFDM data units from access points that are identifiable by a basic service set (BSS) color identifier and a basic service set identifier (BSSID) having a length that is longer than a length of the BSS color identifier. In an embodiment, the client device 25-1 maintains an association of the BSSID with the BSS color identifier such that the client device 25-1 can generally identify which access point has transmitted an OFDM data unit when the OFDM data unit includes the BSS color identifier but omits the BSSID. In an embodiment, the client device 25-1 stores and/or maintains a list of BSS color identifiers that have been received or detected.

Figure 2A:
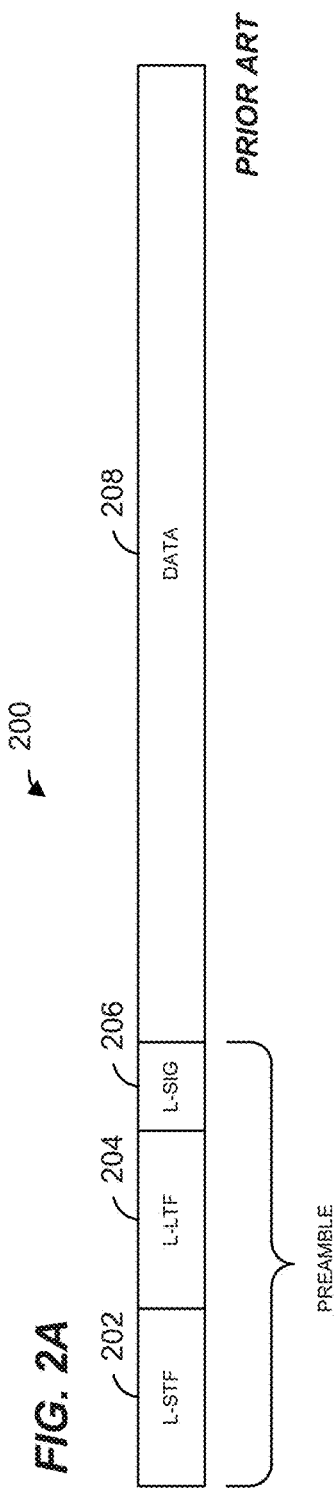
FIGS. 2A and 2B are diagrams of a prior art data unit format.
Figure 2B:
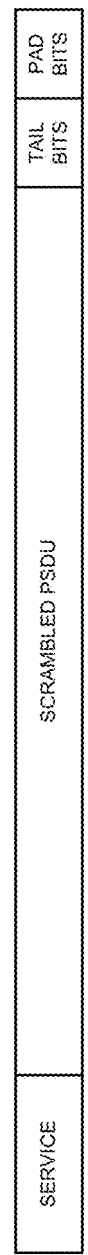

FIG. 2A is a diagram of a prior art orthogonal frequency division multiplexing (OFDM) data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration. In various embodiments, the data portion 208 includes a MAC protocol data unit (MPDU), for example, the MPDU 700 (FIG. 7) or the MPDU 800 (FIG. 8).

Figure 3:
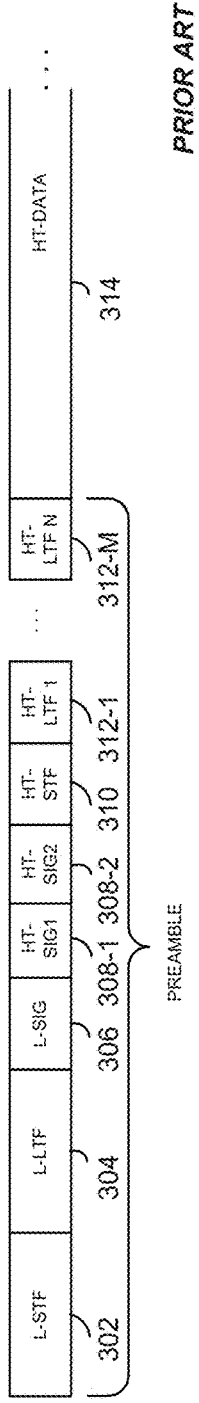
FIG. 3 is a diagram of another prior art data unit format.

FIG. 3 is a diagram of a prior art OFDM data unit 300 that the AP 14 is configured to transmit to the legacy client station 25-4 via OFDM modulation, according to an embodiment. In an embodiment, the legacy client station 25-4 is also configured to transmit the data unit 300 to the AP 14. The data unit 300 conforms to the IEEE 802.11n Standard, occupies a 20 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314. In various embodiments, the data portion 314 includes an MPDU, for example, the MPDU 700 (FIG. 7) or the MPDU 800 (FIG. 8).

Figure 4:
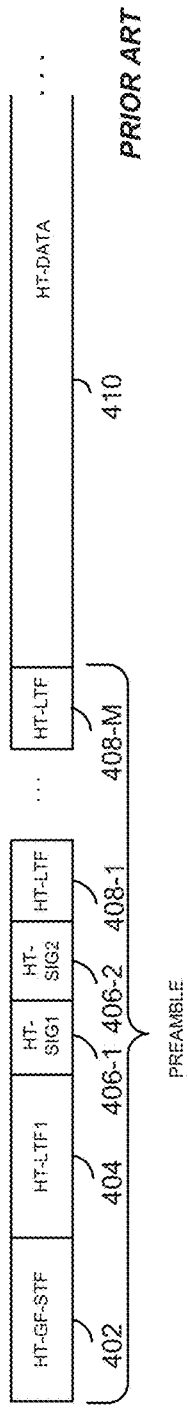
FIG. 4 is a diagram of another prior art data unit format.

FIG. 4 is a diagram of a prior art OFDM data unit 400 that the AP 14 is configured to transmit to the legacy client station 25-4 via OFDM modulation, according to an embodiment. In an embodiment, the legacy client station 25-4 is also configured to transmit the data unit 400 to the AP 14. The data unit 400 conforms to the IEEE 802.11n Standard, occupies a 20 MHz bandwidth, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408. The data unit 400 also includes a data portion 410. In various embodiments, the data portion 410 includes an MPDU, for example, the MPDU 700 (FIG. 7) or the MPDU 800 (FIG. 8).

Figure 5:
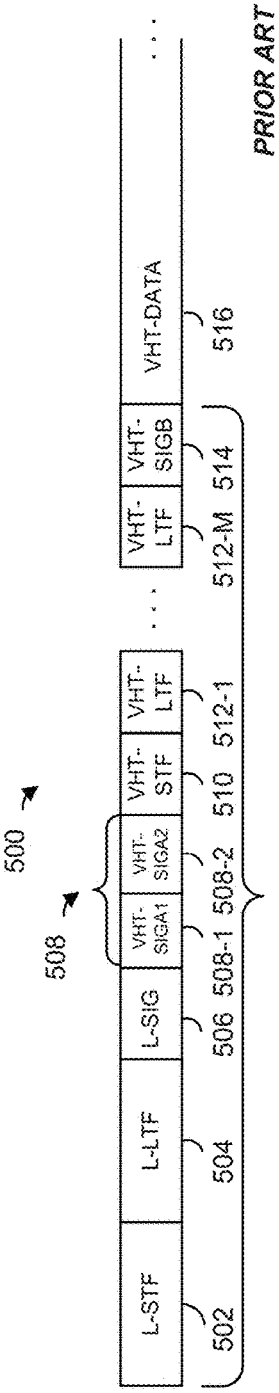
FIG. 5 is a diagram of another prior art data unit format.

FIG. 5 is a diagram of a prior art OFDM data unit 500 that the AP 14 is configured to transmit to the legacy client station 25-4 via OFDM modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different suitable bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, and a second very high throughput signal field (VHT-SIG-B) 514. The data unit 500 also includes a data portion 516. In various embodiments, the data portion 516 includes an MPDU, for example, the MPDU 700 (FIG. 7) or the MPDU 800 (FIG. 8).

In an embodiment, the data unit 500 occupies a bandwidth that is an integer multiple of 20 MHz and the L-STF 502 is duplicated within each 20 MHz sub-band. In an embodiment, the VHT-STF 510 has a duration of 4.0 microseconds and uses a same frequency sequence as the L-STF 502. For example, in an embodiment, the VHT-STF 510 uses the frequency sequence defined in equation 22-29 of the IEEE 802.11ac standard. In at least some embodiments, the VHT-STF 510 occupies a whole bandwidth for the data unit 500 (e.g., 20 MHz, 40 MHz, 80 MHz, etc.) and is mapped to multiple antennas for multiple input, multiple output (MIMO) or beamforming in a manner similar to the data portion 516.

Figure 6:
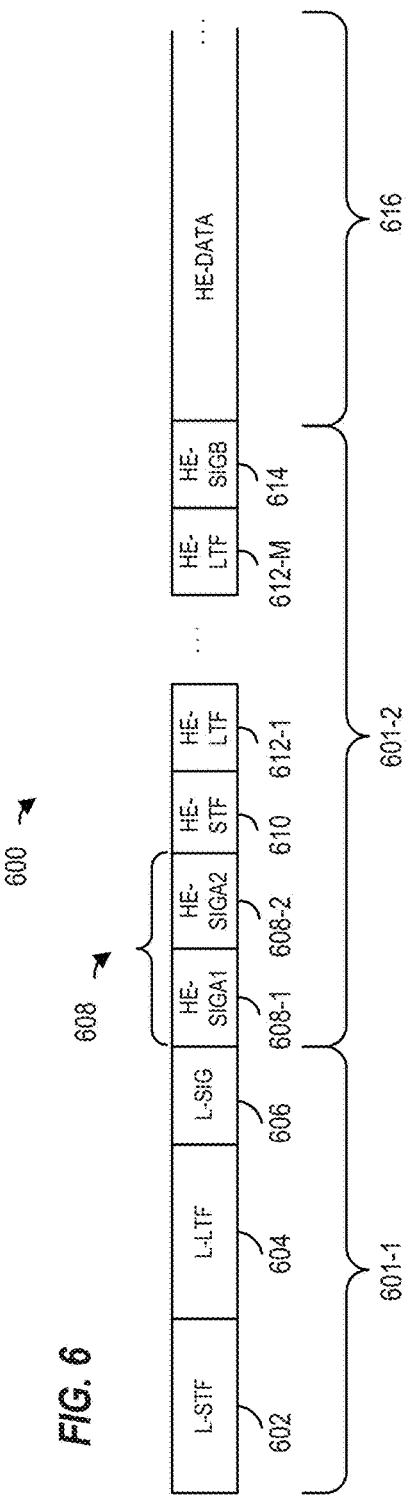
FIG. 6 is a diagram of an orthogonal frequency division multiplexing (OFDM) data unit, according to an embodiment.

FIG. 6 is a diagram of an OFDM data unit 600 that the AP 14 is configured to transmit to the client station 25-1 via orthogonal frequency domain multiplexing (OFDM) modulation, according to an embodiment. In an embodiment, the client station 25-1 is also configured to transmit the data unit 600 to the AP 14. The data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments. The data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the data unit 600 includes a preamble 601 having an L-STF 602, an L-LTF 604, an L-SIG 606, two first HE signal fields (HE-SIGAs) 608 including a first HE signal field (HE-SIGA1) 608-1 and a second HE signal field (HE-SIGA2) 608-2, a HE short training field (HE-STF) 610, M HE long training fields (HE-LTFs) 612, and a third HE signal field (HE-SIGB) 614. In an embodiment, the preamble 601 includes a legacy portion 601-1, including the L-STF 602, the L-LTF 604, and the L-SIG 606, and a non-legacy portion 601-2, including the HE-SIGAs 608, HE-STF 610, M HE-LTFs 612, and HE-SIGB 614.

Each of the L-STF 602, the L-LTF 604, the L-SIG 606, the HE-SIGAs 608, the HE-STF 610, the M HE-LTFs 612, and the HE-SIGB 614 are included in an integer number of one or more OFDM symbols. For example, in an embodiment, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data packet). In various embodiments, the data portion 616 includes an MPDU, for example, the MPDU 700 (FIG. 7) or the MPDU 800 (FIG. 8).

In the embodiment of FIG. 6, the data unit 600 includes one of each of the L-STF 602, the L-LTF 604, the L-SIG 606, and the HE-SIGA1s 608. In other embodiments in which an OFDM data unit similar to the data unit 600 occupies a cumulative bandwidth other than 20 MHz, each of the L-STF 602, the L-LTF 604, the L-SIG 606, the HE-SIGA1s 608 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 602, the L-LTF 604, the L-SIG 606, and the HE-SIGA1s 608 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 600, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 7:
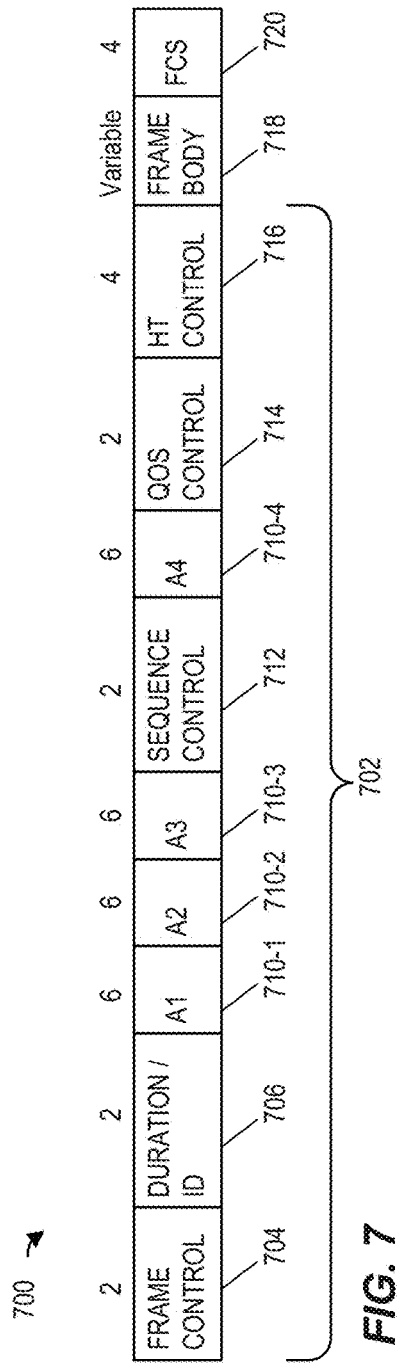
FIG. 7 is a diagram of a medium access control (MAC) protocol data unit (MPDU), according to an embodiment.
Figure 8:
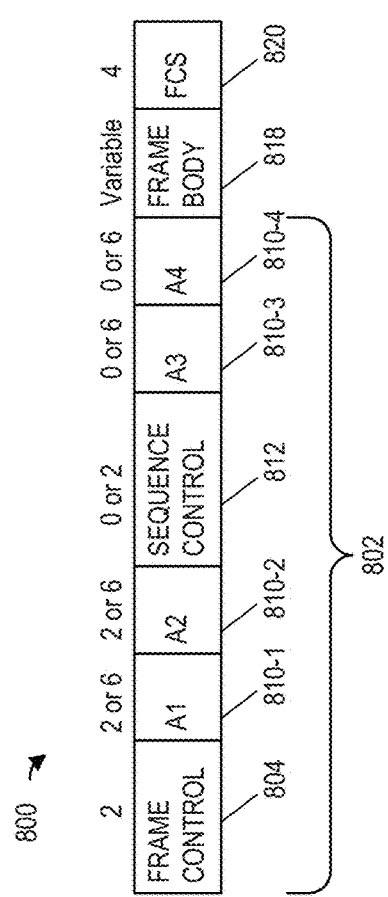
FIG. 8 is a diagram of an MPDU, according to another embodiment.

FIG. 7 is a diagram of an MPDU 700, according to an embodiment. The MPDU 700 includes a MAC header 702, a frame body 704, and a frame check sequence field 720. The number above each field in FIG. 7 indicates the number of octets occupied by the corresponding field. Accordingly, the MAC header 702 includes a frame control field 704 (2 octets), a duration/ID field 706 (2 octets), a first address (A1) field 710-1 (6 octets), a second address (A2) field 710-2 (6 octets), a third address (A3) field (6 octets) 710-3, a sequence control field 712 (2 octets), a fourth address (A4) field 710-4 (6 octets), a QoS control field 714 (2 octets), and an HT control field 716 (4 octets). The data unit 700 also includes the frame body 718 and a four-octet frame check sequence (FCS) field 720. In some embodiments and/or scenarios, the frame body 718 is omitted (e.g., a null data frame). Each of the address fields 710 is a 48 bit (6 octet) field that includes a globally unique MAC address of a device associated with the data unit 700, such as a transmitting device of the data unit 700, a receiving device of the data unit 700, etc. In general, the MAC header 702 occupies 36 octets of the MPDU 700.

FIG. 8 is a diagram of an MPDU 800, according to another embodiment. The MPDU 800 includes a MAC header 802, a frame body 804, and a frame check sequence field 806. The number above each field in FIG. 8 indicates the number of octets occupied by the corresponding field. Accordingly, the MAC header 802 includes a frame control field 804 (2 octets), a first address (A1) field 810-1 (2 or 6 octets), a second address (A2) field 810-2 (2 or 6 octets), a third address (A3) field (0 or 6 octets) 810-3, a sequence control field 812 (0 or 2 octets), and a fourth address (A4) field 810-4 (0 or 6 octets). The data unit 800 also includes the frame body 818 and a four-octet frame check sequence (FCS) field 820. In some embodiments and/or scenarios, the frame body 818 is omitted (e.g., a null data frame).

As compared to the MPDU 700, the MPDU 800 has a "short frame format" having a reduced length of the MAC header 802. In some embodiments and/or scenarios, one or more of the address fields 810-1 or 810-2 is a 48 bit (6 octet) field that includes a globally unique MAC address of a device associated with the data unit 800, such as a transmitting device of the data unit 800, a receiving device of the data unit 800, etc. In other embodiments and/or scenarios, one or more of the address fields 810-1 or 810-2 is a 16 bit (2 octet) field that includes a BSS color identifier, partial association identification (PAID or partial AID), or other suitable address having a reduced length as compared to a MAC address (i.e., less than 6 octets). In various embodiments, the BSS color identifier occupies 6 bits, 7 bits, 10 bits, or another suitable number of bits. In some embodiments and/or scenarios, one or more of the sequence control field 812, the address field 810-3, or the address field 810-4 are optional and omitted from the MAC header 802. In general, the MAC header 802 occupies 6 octets, or up to 28 octets, of the MPDU 800.

Figure 9:
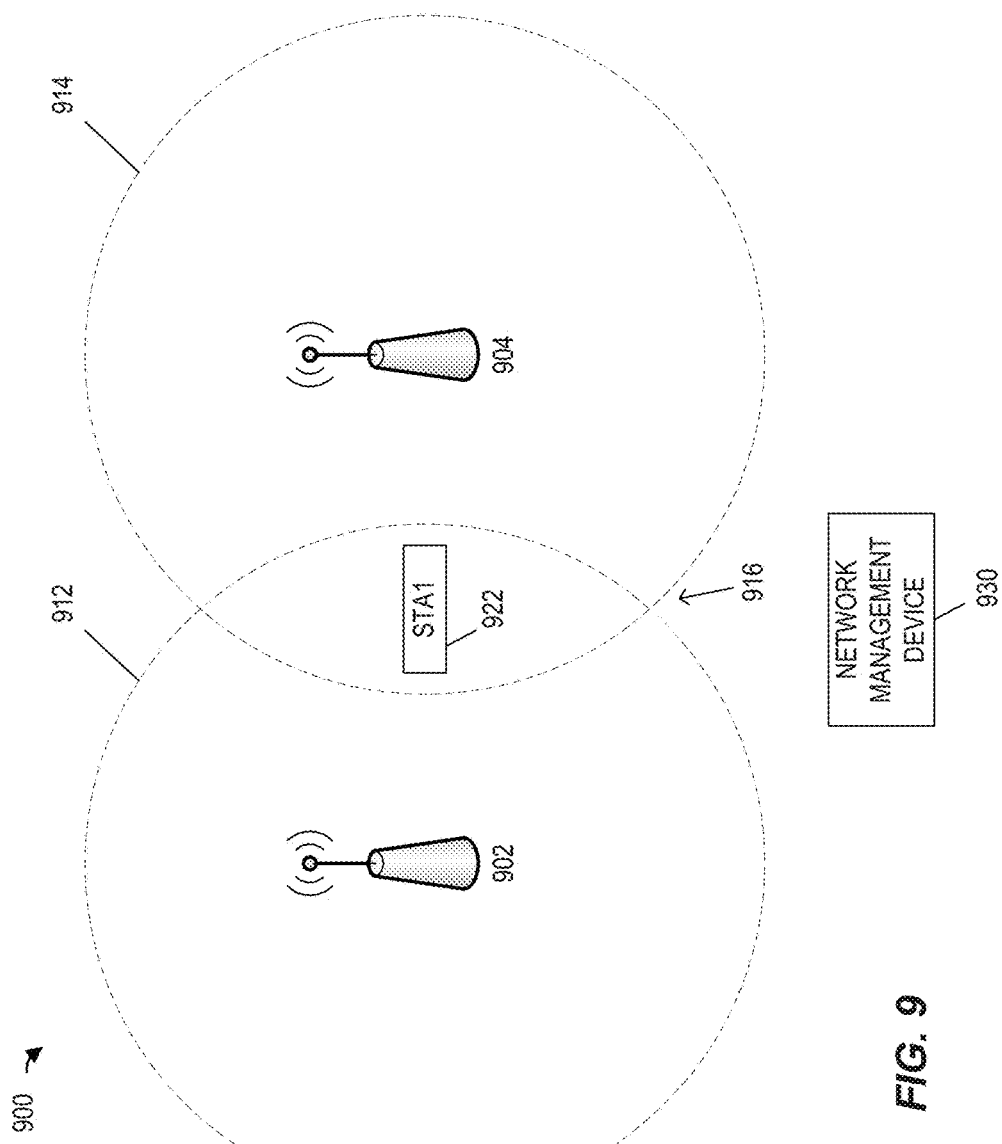
FIG. 9 is a diagram of an example system having a first access point, a second access point, and a network management device, according to an embodiment.

FIG. 9 is a diagram of an example system 900 having a first access point 902, a second access point 904, and a client station (STA1) 922, according to an embodiment. While only two access points and a single client station are shown in FIG. 9, in other embodiments, the system 900 includes other suitable numbers of access points and other suitable numbers of client stations. In an embodiment, the first access point 902 and the second access point 904 are implemented as instances of the access point 14 described above with reference to FIG. 1. In an embodiment, the client station 922 is implemented as an instance of the client station 25. The first access point 902 and the second access point 904 communicate with client stations by transmitting and/or receiving OFDM data units, for example, OFDM data unit 200, OFDM data unit 300, OFDM data unit 400, OFDM data unit 500, or OFDM data unit 600. In some embodiments and/or scenarios, the OFDM data units include an MPDU having a reduced header length using a BSS color identifier or other suitable non-unique identifier for the corresponding access point, for example, the MPDU 800. In an embodiment, for example, the OFDM data units include scheduling frames for uplink orthogonal frequency division multiple access (OFDMA). In some embodiments and/or scenarios, the OFDM data unit includes the BSS color identifier in a PHY field, for example, the HE signal field 608 of the data unit 600.

The first access point 902 and the second access point 904 provide service coverage area 912 and service coverage area 914, respectively. The service coverage area 912 and service coverage area 914 each represent respective physical regions within which a client station may receive and decode transmissions from the corresponding access point, for example, broadcast management frames or downlink data frames provided by the access point. In the example embodiment shown in FIG. 9, the service coverage area 912 at least partially overlaps with the service coverage area 914, the client station 922 is located within an overlapping region 916, and the client station 922 is associated with a wireless local area network provided by the first access point 902.

In some scenarios, the client station 922 receives an OFDM data unit that includes the BSS color identifier to indicate the transmitter of the OFDM data unit. In one such scenario, the client station 922 cannot readily determine which access point transmitted the OFDM data unit if both the first access point 902 and the second access point 904 have a same value for their respective BSS color identifiers (e.g., a "color collision"). In an embodiment, the client station 922 determines that the first access point 902 and the second access point 904 have the same value for their respective BSS color identifiers and generates a notification frame for the first access point 902 to cause a change in the BSS color identifier of the first access point 902. In an embodiment, the first access point 902 determines a new value for its BSS color identifier and changes the BSS color identifier, as described below.

In some embodiments, the system 900 also includes a network management device 930. In an embodiment, the network management device 930 is implemented as an instance of the access point 14 described above with reference to FIG. 1. In another embodiment, the network management device 930 is a network server or other suitable computing device. The network management device 930, when present in the system 900, manages the allocation of BSS color identifiers to access points within the system 900. In an embodiment, the first access point 902 sends an indication of a color collision to the network management device 930. In this embodiment, the network management device 930 determines a new value for the BSS color identifier for the first access point 902. In other embodiments, the network management device 930 selects a new value for the BSS color identifier for the second access point 904.

Figure 10:
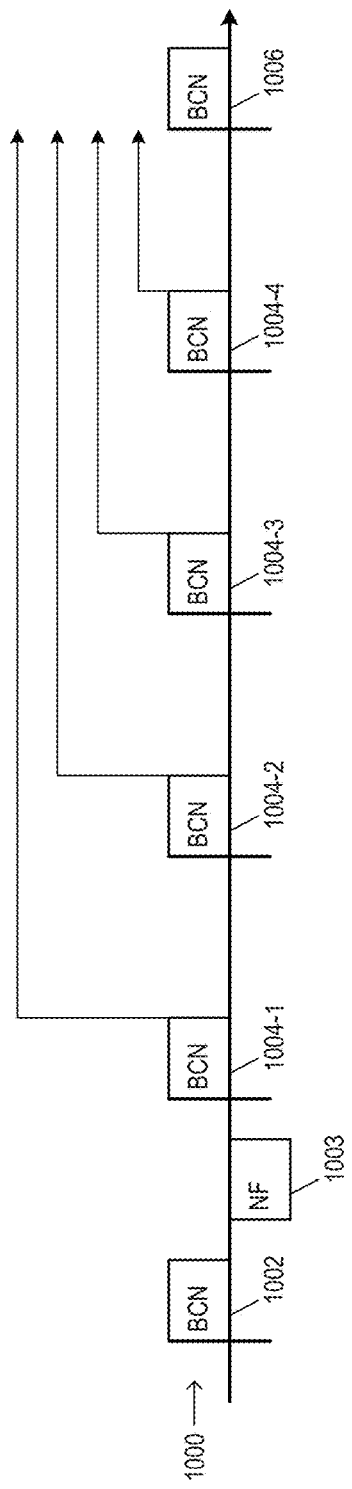
FIG. 10 is a diagram of a sequence of OFDM data units transmitted by an access point for a change in the BSS color identifier of the access point, according to an embodiment.

FIG. 10 is a diagram of a sequence of OFDM data units 1000 transmitted by the first access point 902 for a change in the BSS color identifier of the first access point 902, according to an embodiment. In some embodiments, the OFDM data units 1000 are notification frames. In an embodiment, at least some of the notification frames are beacon management frames transmitted at predetermined beacon intervals. In various embodiments, a current value of the BSS color identifier is included in the frame body of the beacon management frame, for example, within the frame body 718 or frame body 818. In an embodiment, for example, the BSS color identifier is included in an HE Operation element of the beacon management frame. In other embodiments, a suitable location other than the HE Operation element includes the BSS color identifier.

In the embodiment illustrated in FIG. 10, the sequence of OFDM data units 1000 includes a beacon management frame 1002, one or more notification frames 1004, and a beacon management frame 1006. The first access point 902 transmits the beacon management frame 1002, which includes a first value of the BSS color identifier of the first access point 902 and a first BSSID of the first access point 902. In an embodiment, the client station 922 associates with the first access point 902. In an embodiment, the client station 922 receives and decodes the beacon management frame from the second access point 904 and determines that the first access point 902 and the second access point 904 have the same value for their respective BSS color identifiers (e.g., a color collision). In an embodiment, for example, the client station 922 receives an OFDM data unit or beacon management frame (not shown), transmitted by the second access point 904, that indicates a BSSID of the second access point 904 and the BSS color identifier of the second access point 904.

In some embodiments, the client station 922 generates a BSS color collision notification frame 1003 for the first access point 902 in response to the determination of the color collision. In an embodiment, the BSS color collision notification frame 1003 provides a report of neighboring BSS color identifiers and/or neighboring BSSIDs. In an embodiment, the BSS color collision notification frame 1003 includes an indication that the BSS color identifier for the first access point 902 and the BSS color identifier for the second access point 904 have the same first value (e.g., a color collision indication). In an embodiment, the BSS color collision notification frame 1003 includes the color collision indication and the BSSID of the second access point 904. In an embodiment, the BSS color collision notification frame 1003 includes the color collision indication and a set of BSS color identifier values detected by the client station 922, for example, an "occupied" set of values. The client station 922 transmits the BSS color collision notification frame 1003 to the first access point 902. In some embodiments, the access point 902 itself detects that the BSS color identifier for the second access point 904 has the same first value as the access point 902.

In various embodiments, the first access point 902 determines a second value for its BSS color identifier in response to the BSS color collision notification frame 1003. In some embodiments, the first access point 902 selects a second value that is different from the first value. For example, the first access point 902 selects a random value that is different from the first value, adds a predetermined offset to the first value, or selects another suitable value, in various embodiments. In another embodiment, the first access point 902 selects a second value that is not within the set of BSS color identifier values detected by the client station 922 or the access point 902 itself. In yet another embodiment, the first access point 902 transmits the first value and the set of BSS color identifier values to the network management device 930 and receives the second value from the network management device 930.

After the determination of the second value, the first access point 902 generates one or more notification frames 1004 that indicate i) the second value of the first BSS color identifier, and ii) a start time at which the second value will supersede the first value (e.g., a subsequent changeover to the second value), in various embodiments. The notification frames 1004 generally indicate to client stations associated with the first access point 902 that a changeover will occur, while still using the first value of the BSS color identifier.

In some embodiments, the start time corresponds to a predetermined integer number of beacon intervals (BIs). In an embodiment, the start time is based on a backoff or delay to reduce the likelihood of a simultaneous change in the BSS color identifier for multiple access points. In the embodiment shown in FIG. 10, the first access point 902 generates four beacon management frames 1004-1, 1004-2, 1004-3, and 1004-4 to notify client stations of the change of the BSS color identifier and the number of BIs before the new BSS color is used. Each of the beacon management frames 1004 i) identifies the first value of the first BSS color identifier as the transmitter of beacon management frame, ii) indicates the second value, and iii) indicates the start time at which the second value will supersede the first value for subsequent beacon management frames. On or after the start time, the first access point 902 transmits a beacon management frame 1006 that identifies the second value of the first BSS color identifier as the transmitter of beacon management frame 1006. In some embodiments, the start time is immediately after the determination of the second value. In an embodiment, for example, the predetermined integer number of beacon intervals indicated by the beacon management frame is zero.

As discussed above, in an embodiment, the first value of the BSS color identifier is included in the HE Operation element of the beacon management frames 1004. In an embodiment, the second value is included in a Color Change element within the frame body of the beacon management frames 1004. In various embodiments, the Color Change element includes a new color field that indicates the second value and a start time field. In an embodiment, the start time field indicates an effective target beacon transmission time for the beacon management frame 1006. In an embodiment, for example, the start time field of each of the beacon management frames 1004 indicates an integer number of remaining beacon intervals until the second value supersedes the first value (e.g., beacon management frame 1004-1 indicates an integer value of 4, beacon management frame 1004-2 indicates an integer value of 3, beacon management frame 1004-3 indicates an integer value of 2, and beacon management frame 1004-4 indicates an integer value of 1). In another embodiment, the start time field indicates a timing synchronization function (TSF) time.

Figure 11:
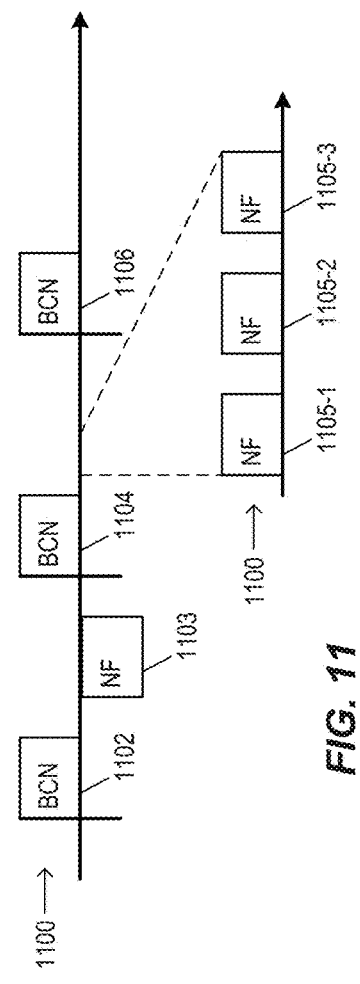
FIG. 11 is a diagram of a sequence of OFDM data units transmitted by the access point for a change in the BSS color identifier of the access point, according to another embodiment.

FIG. 11 is a diagram of a sequence of OFDM data units 1100 transmitted by the first access point 902 for a change in the BSS color identifier of the first access point 902, according to another embodiment. In some embodiments, the OFDM data units 1100 include beacon management frames 1102, 1104, and 1106 and an integer number of BSS color change notification frames 1105. The beacon management frames 1102, 1104, and 1106 are transmitted at predetermined beacon intervals. In various embodiments, a current value of the BSS color identifier is included in the frame body of the beacon management frames 1102, 1104, and 1106, for example, within the frame body 718 or frame body 818.

The first access point 902 transmits the beacon management frame 1102, which includes a first value of the BSS color identifier of the first access point 902 and a first BSSID of the first access point 902. In an embodiment, the client station associates with the first access point 902. In an embodiment, the client station 922 receives and decodes the beacon management frame from the second access point 904 and determines that the first access point 902 and the second access point 904 have the same value for their respective BSS color identifiers (e.g., a color collision). In some embodiments, the client station 922 generates and transmits a BSS color collision notification frame 1103 for the first access point 902 in response to the determination of the color collision, as described above with respect to FIG. 10.

In various embodiments, the first access point 902 determines a second value for its BSS color identifier in response to the BSS color collision notification frame 1103, as described above with respect to FIG. 10. In the embodiment shown in FIG. 11, after determining the second value for the BSS color identifier, the first access point 902 performs a changeover to the second value and begins generating beacon management frames with the second value. For example, after the determination of the second value, the first access point 902 generates the beacon management frame 1104, which identifies the second value of the first BSS color identifier as the transmitter of beacon management frame 1104. Accordingly, a first beacon management frame, generated at a beacon interval that occurs first after the determination of the second value, indicates that the first access point 902 is identifiable by the second value.

The first access point 902 generates one or more BSS color change notification frames that indicate the changeover from the first value to the second value, in various embodiments. In some embodiments, the first access point 902 generates a plurality of BSS color change notification frames within one or more beacon intervals after the changeover. In an embodiment, the first access point 902 transmits each of the plurality of BSS color change notification frames 1105 between i) the beacon interval of the predetermined beacon intervals that occurs first after the determining of the second value of the first BSS color identifier (e.g., the beacon interval corresponding to the beacon management frame 1104), and ii) a beacon interval of the predetermined beacon intervals that occurs second after the determining of the second value of the first BSS color identifier (e.g., the beacon interval corresponding to the beacon management frame 1106). In the embodiment shown in FIG. 11, the first access point 902 generates three BSS color change notification frames 1105-1, 1105-2, and 1105-3 and transmits each of the BSS color change notification frames within a single beacon interval. The first access point 902 uses other suitable numbers of BSS color change notification frames and other suitable numbers of beacon intervals, in various embodiments.

Figure 12:
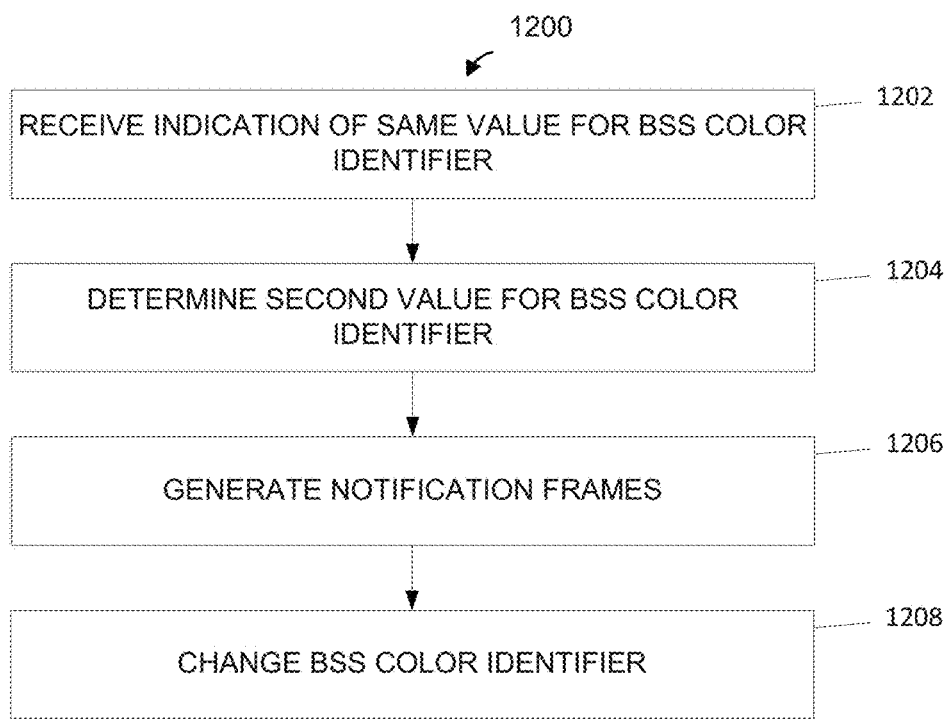
FIG. 12 is a flow diagram illustrating an example method for changing a first basic service set (BSS) color identifier for a first communication device, according to an embodiment.

FIG. 12 is a flow diagram illustrating an example method 1200 for changing a first basic service set (BSS) color identifier for a first communication device, according to an embodiment. With reference to FIG. 1, the method 1200 is implemented by the network interface 16, in an embodiment. For example, in one such embodiment, the PHY processing unit 20 is configured to implement the method 1200. According to another embodiment, the MAC processing 18 is also configured to implement at least a part of the method 1200. With continued reference to FIG. 1, in yet another embodiment, the method 1200 is implemented by the network interface 27 (e.g., the PHY processing unit 29 and/or the MAC processing unit 28). In other embodiments, the method 1200 is implemented by other suitable network interfaces.

At block 1202, an indication that the first BSS color identifier for the first communication device and a second BSS color identifier for a second communication device have a same first value is received. In an embodiment, the indication comprises the BSS color collision notification frame 1003, as described above with respect to FIG. 10. In an embodiment, the indication is received by the first access point 902, the second access point 904, or another suitable communication device. As described above, the first access point 902 is identifiable by i) the first BSS color identifier, and ii) the first BSSID having a length that is longer than a length of the first BSS color identifier. In an embodiment, a first service coverage area of the first communication device at least partially overlaps a second service coverage area of the second communication device.

At block 1204, a second value of the first BSS color identifier is determined in response to the indication received in block 1202. In an embodiment, the determination corresponds to the determination of the second value by the first access point 902, as described above with respect to FIG. 10.

At block 1206, one or more BSS color change notification frames are generated that indicate i) the second value of the first BSS color identifier, and ii) a start time at which the second value will supersede the first value of the first BSS color identifier. In an embodiment, the BSS color change notification frames include the beacon management frames 1004, as described above with respect to FIG. 10. In another embodiment, the BSS color change notification frames include the notification frames 1105, as described above with respect to FIG. 11.

At block 1208, the first BSS color identifier is changed to the second value based on the start time.

Figure 13:
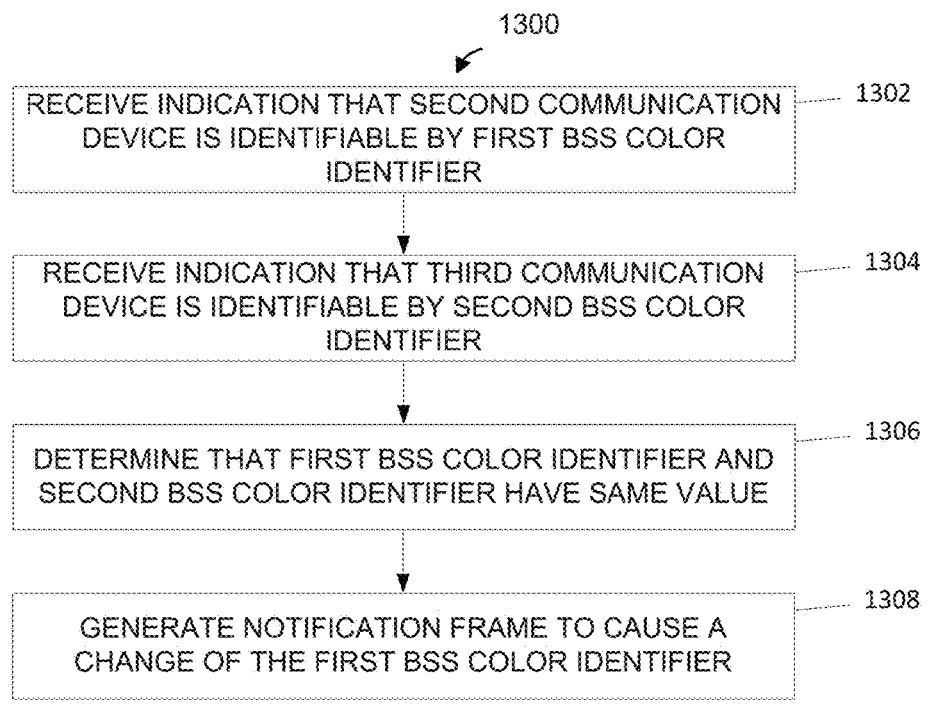
FIG. 13 is a flow diagram illustrating an example method for causing a change of a first BSS color identifier for a first communication device, according to an embodiment.

FIG. 13 is a flow diagram illustrating an example method 1300 for causing a change of a first BSS color identifier for a first communication device, according to an embodiment. With reference to FIG. 1, the method 1300 is implemented by the network interface 16, in an embodiment. For example, in one such embodiment, the PHY processing unit 20 is configured to implement the method 1300. According to another embodiment, the MAC processing 18 is also configured to implement at least a part of the method 1300. With continued reference to FIG. 1, in yet another embodiment, the method 1300 is implemented by the network interface 27 (e.g., the PHY processing unit 29 and/or the MAC processing unit 28). In other embodiments, the method 1300 is implemented by other suitable network interfaces.

At block 1302, a first indication is received from a second communication device and by a third communication device. The first indication indicates that the second communication device is identifiable by i) a first BSS color identifier, and ii) a second BSSID. In an embodiment, the first indication is a beacon management frame received by the client station 922, for example, a beacon management frame 1002 transmitted by the second access point 904.

At block 1304, a second indication is received from a first communication device and by the third communication device. The second indication indicates that the second communication device is identifiable by i) a first BSS color identifier, and ii) a second BSSID. In an embodiment, the second indication is a beacon management frame received by the client station 922, for example, a beacon management frame 1002 transmitted by the first access point 902. In an embodiment, a first service coverage area of the first communication device at least partially overlaps a second service coverage area of the second communication device.

At block 1306, it is determined that the first BSS color identifier for the first communication device and the second BSS color identifier for the second communication device have a same first value.

At block 1308, a notification frame is generated for the first communication device to cause a change of the first BSS color identifier. In an embodiment, the notification frame includes i) an indication that the first BSS color identifier for the first communication device and the second BSS color identifier for the second communication device have the same first value, and ii) the second BSSID. In an embodiment, the notification frame is the BSS color collision notification frame 1003, as described above with respect to FIG. 10. In another embodiment, the notification frame is the BSS color collision notification frame 1103, as described above with respect to FIG. 11.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for changing a first basic service set (BSS) color identifier for a first communication device identifiable by i) the first BSS color identifier, and ii) a first basic service set identifier (BSSID) having a length that is longer than a length of the first BSS color identifier, the method comprising:
receiving, by the first communication device, an indication that the first BSS color identifier for the first communication device and a second BSS color identifier for a second communication device have a same first value, wherein a first service coverage area of the first communication device at least partially overlaps a second service coverage area of the second communication device;
determining, by the first communication device, a second value of the first BSS color identifier in response to the indication;
generating, by the first communication device, one or more notification frames that indicate i) the second value of the first BSS color identifier, and ii) a start time at which the second value will supersede the first value of the first BSS color identifier, wherein the start time corresponds to a backoff delay after receiving the indication and before using the second value; and
changing, by the first communication device, the first BSS color identifier to the second value based on the start time.

2. The method of claim 1, wherein the one or more notification frames comprise one or more first beacon management frames that i) identify the first value of the first BSS color identifier as corresponding to a transmitter of the corresponding beacon management frame, ii) indicate the second value of the first BSS color identifier, and iii) indicate the start time at which the second value will supersede the first value for subsequent beacon management frames.

3. The method of claim 2, wherein:
the one or more first beacon management frames comprise a predetermined integer number of first beacon management frames; and
the method further comprises:
transmitting, by the first communication device, each of the predetermined integer number of first beacon management frames at predetermined beacon intervals,
generating, by the first communication device, a second beacon management frame that indicates i) the second value of the first BSS color identifier as a transmitter of the second beacon management frame, and
transmitting, by the first communication device, the second beacon management frame based on the start time indicated by the one or more first beacon management frames.

4. The method of claim 1, wherein the start time at which the second value will supersede the first value of the first BSS color identifier is an effective target beacon transmission time (TBTT).

5. The method of claim 1, wherein the start time at which the second value will supersede the first value of the first BSS color identifier is a timing synchronization function (TSF) time.

6. The method of claim 1, further comprising generating, by the first communication device, beacon management frames for transmission by the first communication device at predetermined beacon intervals;
wherein:
a first beacon management frame, generated at a beacon interval of the predetermined beacon intervals that occurs first after the determining of the second value of the first BSS color identifier, indicates that the first communication device is identifiable by the second value of the first BSS color identifier; and
generating the one or more notification frames comprises generating one or more notification frames that indicate a changeover by the first communication device from the first value to the second value.

7. The method of claim 6, wherein:
the one or more notification frames comprise a plurality of notification frames; and
the method further comprises transmitting each of the plurality of notification frames between i) the beacon interval of the predetermined beacon intervals that occurs first after the determining of the second value of the first BSS color identifier, and ii) a beacon interval of the predetermined beacon intervals that occurs second after the determining of the second value of the first BSS color identifier.

8. The method of claim 1, wherein:
the indication that the first BSS color identifier for the first communication device and the second BSS color identifier for the second communication device have the same first value comprises a set of BSS color identifier values detected by a third communication device associated with the first communication device; and determining the second value for the first BSS color identifier comprises determining the second value to be a value that is not within the set of BSS color identifier values detected by the third communication device.

9. The method of claim 1, wherein:
the indication that the first BSS color identifier for the first communication device and the second BSS color identifier for the second communication device have the same first value comprises a set of BSS color identifier values detected by a third communication device associated with the first communication device; and determining the second value for the first BSS color identifier comprises:
transmitting the first value and the set of BSS color identifier values to a network management device, and
receiving the second value from the network management device.

10. The method of claim 1, wherein the start time indicates an integer number of remaining beacon management frames until the second value supersedes the first value.

11. The method of claim 1, wherein the start time corresponds to an effective target beacon transmission time for a beacon management frame to be transmitted by the first communication device and that identifies the second value of the first BSS color identifier as the transmitter of the beacon management frame.

12. The method of claim 1, wherein the one or more notification frames indicate to client stations associated with the first communication device that a changeover, from the first value to the second value, will occur while still using the first value of the BSS color identifier.

13. A first communication device that is identifiable by i) a first basic service set (BSS) color identifier, and ii) a first basic service set identifier (BSSID) having a length that is longer than a length of the first BSS color identifier, the first communication device comprising:
a network interface device having one or more integrated circuits configured to:
receive an indication that the first BSS color identifier for the first communication device and a second BSS color identifier for a second communication device have a same first value, wherein a first service coverage area of the first communication device at least partially overlaps a second service coverage area of the second communication device,
determine a second value of the first BSS color identifier in response to the indication,
generate one or more notification frames that indicate i) the second value of the first BSS color identifier, and ii) a start time at which the second value will supersede the first value of the first BSS color identifier, wherein the start time corresponds to a backoff delay after receiving the indication and before using the second value, and
change the first BSS color identifier to the second value based on the start time.

14. The first communication device of claim 13, wherein the one or more notification frames comprise one or more first beacon management frames that i) identify the first value of the first BSS color identifier as corresponding to a transmitter of the corresponding beacon management frame, ii) indicate the second value of the first BSS color identifier, and iii) indicate the start time at which the second value will supersede the first value for subsequent beacon management frames.

15. The first communication device of claim 14, wherein:
the one or more first beacon management frames comprise a predetermined integer number of first beacon management frames; and
the one or more integrated circuits configured to:
transmit each of the predetermined integer number of first beacon management frames at predetermined beacon intervals,
generate a second beacon management frame that indicates i) the second value of the first BSS color identifier as a transmitter of the second beacon management frame, and
transmit the second beacon management frame based on the start time indicated by the one or more first beacon management frames.

16. The first communication device of claim 13, wherein the start time at which the second value will supersede the first value of the first BSS color identifier is an effective target beacon transmission time (TBTT).

17. The first communication device of claim 13, wherein the start time at which the second value will supersede the first value of the first BSS color identifier is a timing synchronization function (TSF) time.

18. The first communication device of claim 13, wherein:
the one or more integrated circuits are configured to generate beacon management frames for transmission by the first communication device at predetermined beacon intervals;
a first beacon management frame, generated at a beacon interval of the predetermined beacon intervals that occurs first after the second value of the first BSS color identifier is determined, indicates that the first communication device is identifiable by the second value of the first BSS color identifier; and
the one or more integrated circuits are configured to generate one or more notification frames that indicate a changeover by the first communication device from the first value to the second value.

19. The first communication device of claim 18, wherein:
the one or more notification frames comprise a plurality of notification frames; and
the one or more integrated circuits are configured to transmit each of the plurality of notification frames between i) the beacon interval of the predetermined beacon intervals that occurs first after the second value of the first BSS color identifier is determined, and ii) a beacon interval of the predetermined beacon intervals that occurs second after the second value of the first BSS color identifier is determined.

20. The first communication device of claim 13, wherein:
the indication that the first BSS color identifier for the first communication device and the second BSS color identifier for the second communication device have the same first value comprises a set of BSS color identifier values detected by a third communication device associated with the first communication device; and
the one or more integrated circuits are configured to determine the second value to be a value that is not within the set of BSS color identifier values detected by the third communication device.

21. The first communication device of claim 13, wherein:
the indication that the first BSS color identifier for the first communication device and the second BSS color identifier for the second communication device have the same first value comprises a set of BSS color identifier values detected by a third communication device associated with the first communication device; and the one or more integrated circuits are configured to:
transmit the first value and the set of BSS color identifier values to a network management device, and receive the second value from the network management device.

22. The first communication device of claim 13, wherein the start time indicates an integer number of remaining beacon management frames until the second value supersedes the first value.

23. The first communication device of claim 13, wherein the start time corresponds to an effective target beacon transmission time for a beacon management frame to be transmitted by the first communication device and that identifies the second value of the first BSS color identifier as the transmitter of the beacon management frame.

24. The first communication device of claim 13, wherein the one or more notification frames indicate to client stations associated with the first communication device that a changeover, from the first value to the second value, will occur while still using the first value of the BSS color identifier.

* * * * *